United States Patent
Frey

(10) Patent No.: US 9,511,637 B1
(45) Date of Patent: Dec. 6, 2016

(54) TRAILER TONGUE GUIDE

(71) Applicant: Phillip Clark Frey, Bigfork, MT (US)

(72) Inventor: Phillip Clark Frey, Bigfork, MT (US)

( * ) Notice: Subject to any disclaimer, the term of this patent is extended or adjusted under 35 U.S.C. 154(b) by 0 days.

(21) Appl. No.: 14/803,064

(22) Filed: Jul. 18, 2015

(51) Int. Cl.
*B60D 1/36* (2006.01)
*B60D 1/06* (2006.01)

(52) U.S. Cl.
CPC .................... *B60D 1/065* (2013.01)

(58) Field of Classification Search
None
See application file for complete search history.

(56) References Cited

U.S. PATENT DOCUMENTS

| | | | | |
|---|---|---|---|---|
| 929,920 A * | 8/1909 | Davis | ...................... | B60D 1/36 280/477 |
| 4,854,604 A * | 8/1989 | Stallsworth | ............ | B60D 1/363 280/477 |
| 5,080,386 A * | 1/1992 | Lazar | .................... | B60D 1/363 280/477 |
| 5,330,196 A * | 7/1994 | Ricles | .................... | B60D 1/363 280/477 |
| 5,529,330 A * | 6/1996 | Roman | .................. | B60D 1/363 280/477 |
| 5,725,232 A * | 3/1998 | Fleming | ................... | B60D 1/52 280/477 |
| 5,779,256 A * | 7/1998 | Vass | ....................... | B60D 1/363 280/477 |
| 6,976,694 B1 * | 12/2005 | Rayl | ..................... | B60D 1/363 280/477 |
| 7,744,110 B1 * | 6/2010 | Ramon | .................. | B60D 1/363 280/477 |
| 2007/0007748 A1 * | 1/2007 | Hancock | .................. | B60D 1/36 280/477 |
| 2007/0114760 A1 * | 5/2007 | Hegefeld | ............... | B60D 1/363 280/477 |

* cited by examiner

Primary Examiner — Tony Winner

(57) ABSTRACT

A removable guiding apparatus, placed on a trailer hitch extension, that will force the tongue of a trailer over the trailer hitch ball. This system is designed such that the positioning components will force the trailer tongue into position over the hitch ball should the tongue and hitch ball be slightly out of alignment during the backing of the vehicle toward the trailer tongue. These positioning components can be easily placed upon and removed from a plate that is permanently attached to the underside of the trailer hitch extension and hitch ball. The ability to remove these positioning components allows for a wide swing of the trailer tongue during towing as well as unobstructed access to the hitch area.

1 Claim, 4 Drawing Sheets

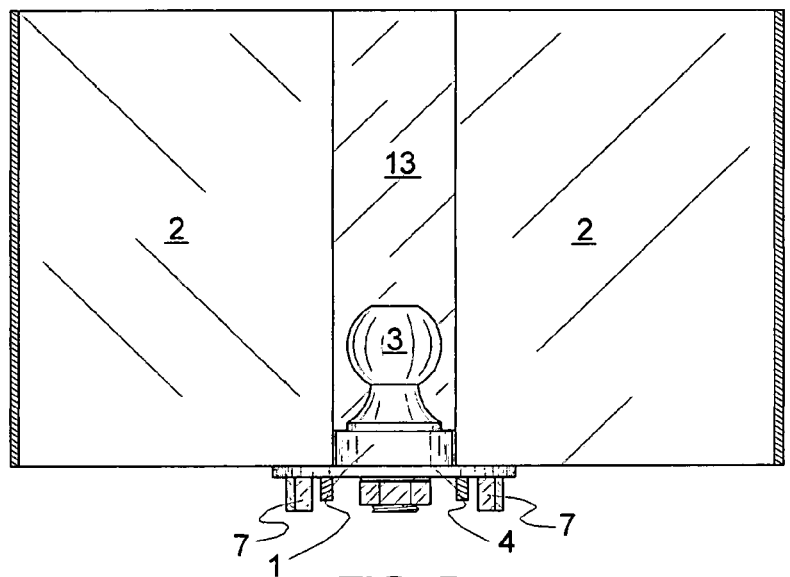
FIG. 5
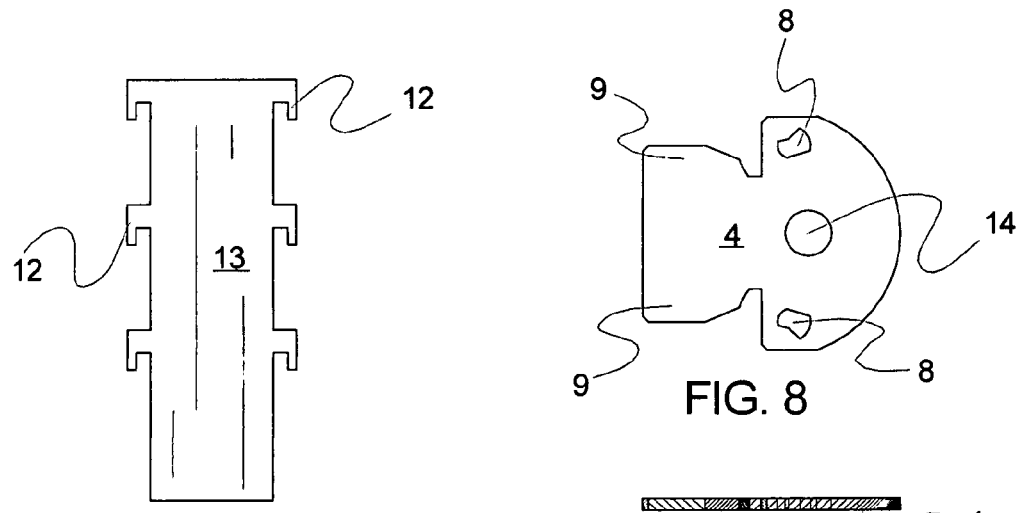
FIG. 6
FIG. 8
FIG. 9
FIG. 7

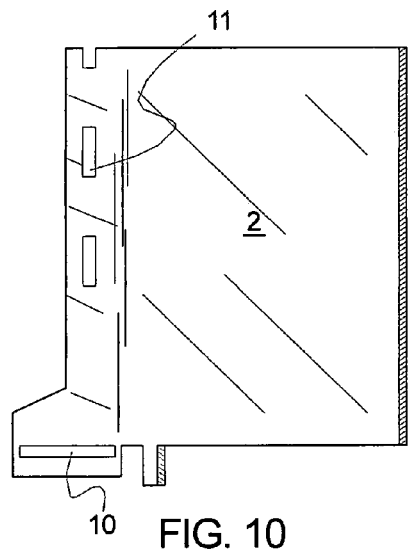
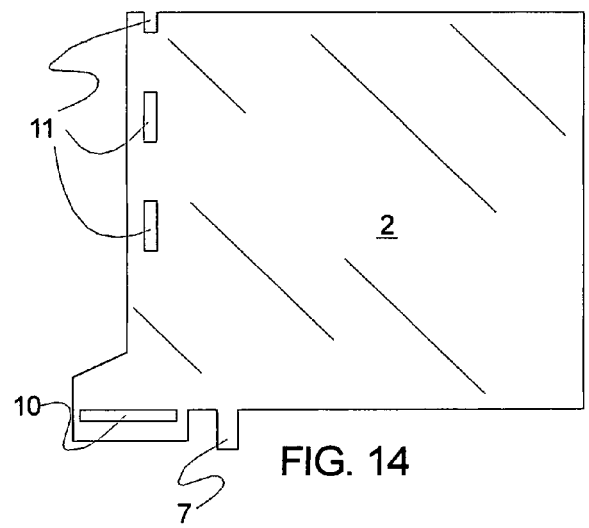
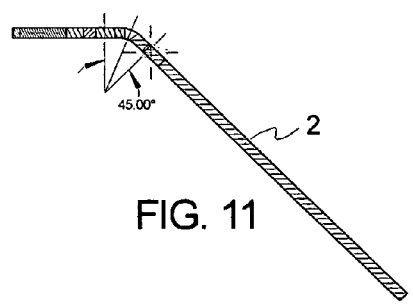
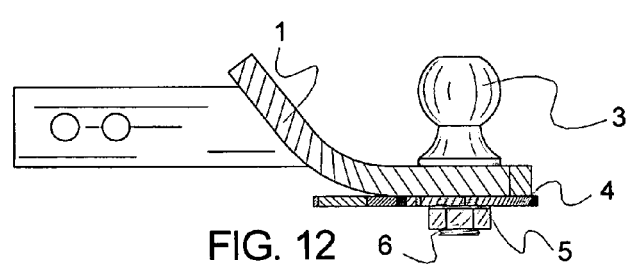
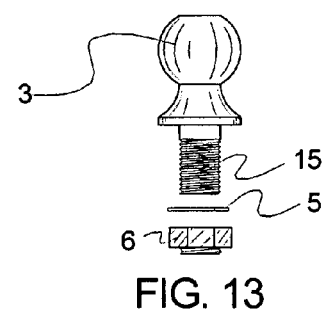

TRAILER TONGUE GUIDE

BACKGROUND OF THE INVENTION

1. Field of the Invention

The present invention relates to a vehicular trailer hitch and the associated trailer tongue, and more specifically a uniquely designed apparatus that simplifies the connecting of the two.

2. Description of Related Art

A conventional trailer hitch may have a guiding device consisting of two vertical steel plates placed in either side of the hitch ball and angling out and away from the center line of the hitch such that the plates will force the trailer tongue into position over the hitch ball.

However, these plates are generally permanently attached to the trailer hitch extension and extend to the rear of the hitch creating an unsightly appearance as well as presenting an obstacle to a person attaching the trailer tongue to the trailer hitch ball.

BRIEF SUMMARY OF THE INVENTION

This invention, a connecting apparatus, that allows for the attachment and removal of the aforementioned plates, hereinafter fans, that when incorporated into the fans allows for said fans to be temporally set into a horizontal plate, hereinafter baseplate; the baseplate being permanently attached to the underside of a trailer hitch extension. The fans extend approximately 45 degrees from either side of the hitch ball, and are designed to force the trailer tongue into position directly over the hitch ball as the vehicle is backed toward the trailer tongue.

After the trailer tongue is positioned over the hitch ball the fans can be removed from the baseplate thereby eliminating the unsightliness and obstacle noted in the background of the invention.

BRIEF DESCRIPTION OF THE SEVERAL VIEWS OF THE DRAWINGS

FIG. 5 is the rear view in elevation of the trailer tongue guide, baseplate, hitch extension and hitch ball.

FIG. 6 is the rear view in elevation of the tongue-stop/connecting plate.

FIG. 7 is the plan view of the tongue-stop/connecting plate.

FIG. 8 is a plan view of the baseplate.

FIG. 9 is a view in elevation of the baseplate.

FIG. 10 is the left fan in elevation.

FIG. 11 is the plan view of the left fan.

FIG. 12 is a view in elevation of the trailer hitch extension and hitch ball with the baseplate attached between the extension and hitch ball shaft nut.

FIG. 13 is the trailer hitch ball, lock washer, hitch ball shaft and hitch ball shaft nut in elevation.

FIG. 14 is a view in elevation of the fan surface prior to bending along its vertical axes.

DETAILED DESCRIPTION OF THE INVENTION

The description of the invention will be significantly easier to understand by referencing the various FIGs. attached hereto. The information stated as being located up, down, left, right, center, etc. is to be recognized as normal positioning when viewing the associated drawings.

Elements shown in FIGS. 12 and 13, with the exception of the baseplate 4, are not considered part of the invention but are pictured and described so as to better demonstrate the method by which the invention is depicted, assembled and used.

Figure 1:
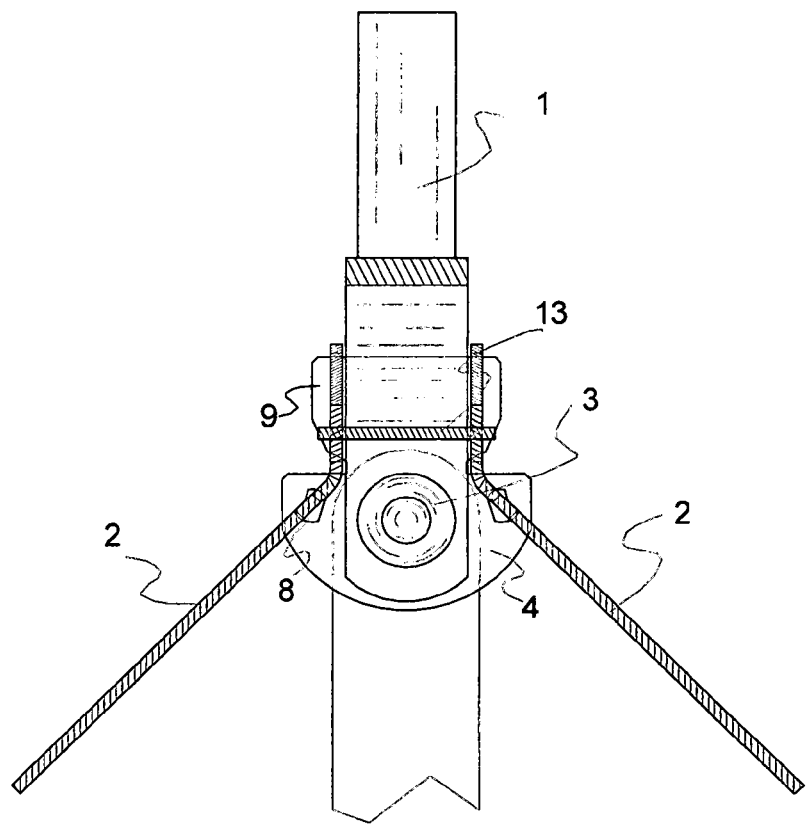
FIG. 1 is the plan view of the trailer tongue guide, hitch extension and hitch ball.
Figure 3:
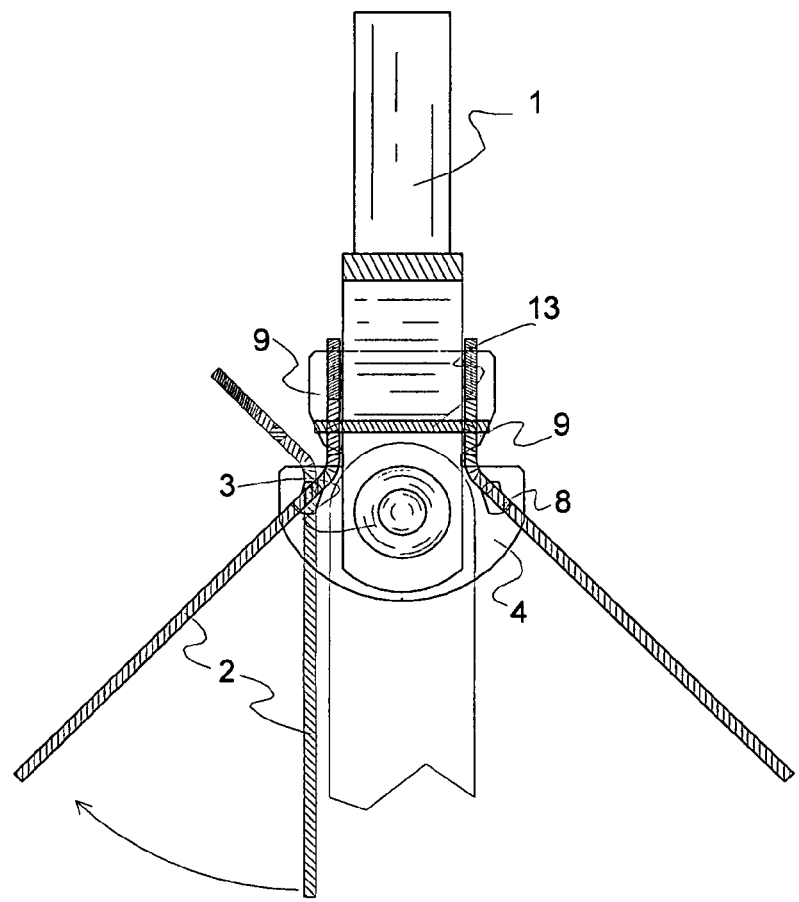
FIG. 3 is the plan view of the trailer tongue guide, hitch extension, hitch ball and baseplate showing the left tongue guide rotating into the locking position on the baseplate.

FIG. 14 is a drawing of one of the two metal plates that are cut to form the rectangular fans 2 showing a rotating pin 7 as an extension from the lower left bottom of the fan 2. A stabilizing lug receiving slot 10 is cut into the fan 2 to the left of the rotating pin 7. A series of locking hook slots 11 are cut into the left side of the depicted fan 2. Similar cuts and pin extension would be made on the opposing fan 2. As depicted in FIGS. 10 and 11 a 45 degree bend is made along the left side and slightly right of the locking hook slots 11 and stabilizing lug receiving slot 10. A bend in the opposite direction is made for the opposing fan 2 that would set in position as shown in FIGS. 1, 3 and 5.

A tongue-stop/connecting plate 13 is cut as shown in FIGS. 6 and 7 with a series of locking hooks 12 on each side.

The steel baseplate 4, FIGS. 8 and 9 appearing as a spade-like shaped plate, has two diametrically opposed rotating pin slots 8 and stabilizing lugs 9 near the upper and lower left edges. A trailer hitch ball shaft hole 14 is cut into the center.

Figure 2:
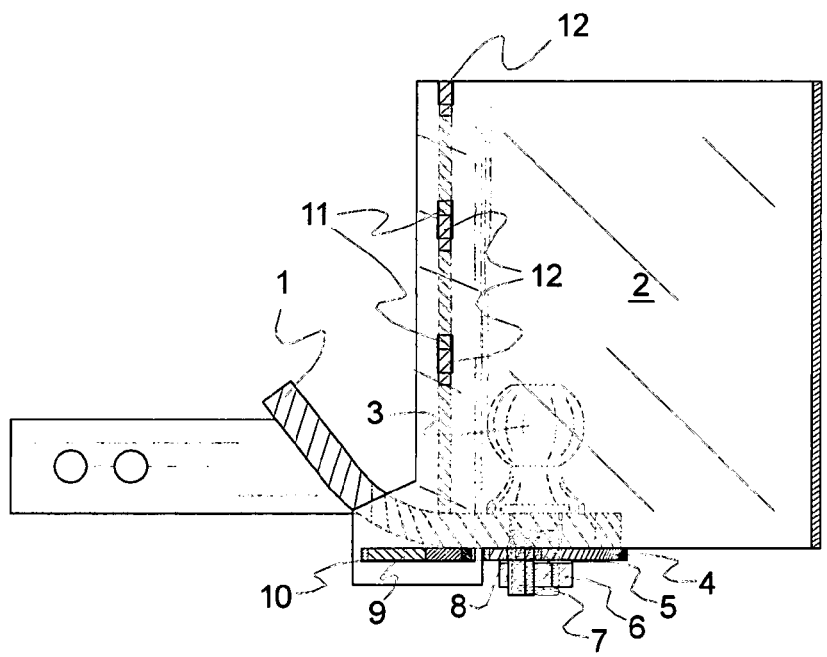
FIG. 2 is the side view in elevation of the trailer tongue guide, hitch extension and hitch ball.
Figure 4:
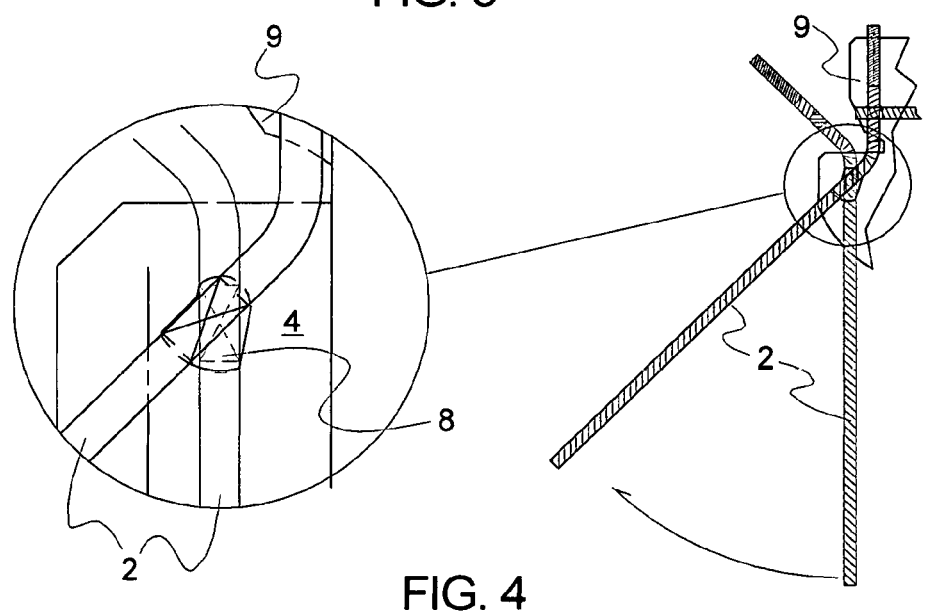
FIG. 4 is an exploded plan view of the rotating pin and rotating pin slot.

The invention is assembled as follows: FIG. 13 shows the hitch ball 3, hitch ball shaft 15, lock washer 5 and hitch ball shaft nut 6. FIG. 9 shows, in elevation, the baseplate 4 which has been secured to the underside of the hitch extension 1 by having been placed in-between the hitch extension 1, the lock washer 5 and shaft nut 6. FIGS. 1, 2, 3 and 5 depict the positioning of Fans 2. That is: the rotating pins 7 are dropped into the rotating pin slots 8 on the left and right side of the baseplate 4. As shown in FIGS. 2, 3 and 4, the fans 2 are then rotated into position causing the stabilizing lug receiving slots 10 to slide over the stabilizing lugs 9, thereby securing the fans 2 to the baseplate 4. Next, the locking hooks 12 on the tongue-stop/connecting plate 13 are dropped into the locking hook slots 11 of each fan 2, thereby preventing the fans 2 from rotating out of position as shown in FIGS. 1, 2 and 3. FIGS. 2 and 5 show, in elevation, the location of the hitch ball 3 as it would appear between the fans 2. FIG. 1 and tare to be used as front page views.

When not in use, the fans 2 are removed from the baseplate 4 and stored. The baseplate 4 is permanently attached to the underside of the hitch extension 1. Prior to backing the vehicle toward the trailer tongue, the trailer tongue guide is fully assembled as noted above. The trailer tongue is then elevated slightly above the plain of the hitch ball 3. The trailer tongue guide now offers a wider angle of approach to the trailer tongue as the vehicle is backed into position. Should the hitch ball 3 be slightly unaligned with the trailer tongue, the tongue will come into contact with one of the fans 2. As the vehicle continues its rearward movement, the fan 2 will force the trailer tongue either left or right into position over the hitch ball 3 with the tongue-stop/connecting plate 13 stopping the trailer tongue from continuing past the hitch ball 3. Once the trailer tongue is over the hitch ball 3 the fans 2 and the tongue-stop/connecting plate 13 can be removed and stored; thereby providing for easy access to the trailer tongue and hitch ball 3. The tongue can now be lowered onto the hitch ball 3.

What is claimed is:

1. A self-centering apparatus for use in combination with a towing vehicle for coupling a trailer to said towing vehicle, said apparatus comprising:

a hitch extension detachably attached to said towing vehicle;

a baseplate having three holes and stabilizing lugs, said first hole is circular in shape, second and third holes are conical shaped and locates on either side of said first hole, said base plate is configured to permanently fixed to a bottom of said hitch extension;

rectangular steel plates having a first end, a second end, and a rotating pin, said first end includes a plurality of vertical rectangular slots along its upper edge and a lug receiving slot at its lower edge, said rotating pin is adjacent to said receiving slot, said steel plates each is detachably attached to said hitch extension at said first end and said second end is spaced apart from said hitch extension at a 45 degrees angle with said rotating pin receives by said conical shaped hole; and an elongated rectangular metal plate having downward pointing hooks located on the outer edges, said hooks are detachably attached to said vertical rectangular slots.

* * * * *